G. E. CRONK.
CAMPING APPARATUS.
APPLICATION FILED FEB. 17, 1908.

955,140.

Patented Apr. 19, 1910.
3 SHEETS—SHEET 1.

Witnesses:
Mathew T Cronk
Benjamin Cronkite

Inventor:
George E Cronk

G. E. CRONK.
CAMPING APPARATUS.
APPLICATION FILED FEB. 17, 1908.
955,140.
Patented Apr. 19, 1910.
3 SHEETS—SHEET 2.
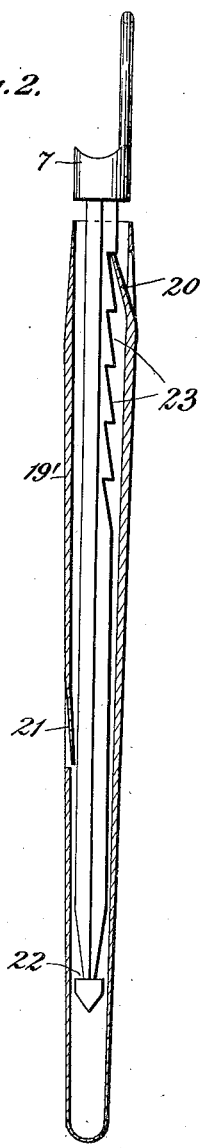
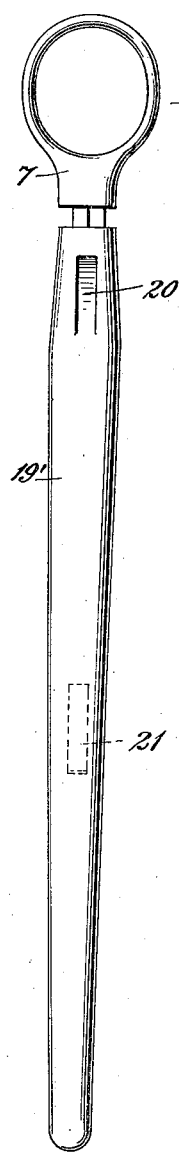
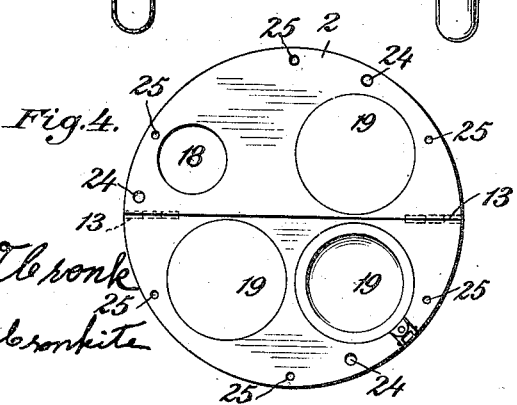

G. E. CRONK.
CAMPING APPARATUS.
APPLICATION FILED FEB. 17, 1908.

955,140.

Patented Apr. 19, 1910.
3 SHEETS—SHEET 3.

Witnesses:
Mathew T. Cronk
Benjamin Cronkite

Inventor:
George E. Cronk

UNITED STATES PATENT OFFICE.

GEORGE E. CRONK, OF SAYRE, OKLAHOMA.

CAMPING APPARATUS.

955,140.
Specification of Letters Patent.
Patented Apr. 19, 1910.

Application filed February 17, 1908. Serial No. 416,416.

*To all whom it may concern:*

Be it known that I, GEORGE E. CRONK, a citizen of the United States, residing at Sayre, in the county of Beckham and State of Oklahoma, have invented certain new and useful Improvements in Camping Apparatus, of which the following is a full, clear, and exact description.

The object of this invention is to produce a single structure which will meet more nearly all of the requirements of soldiers, hunters, sportsmen, and others who travel overland or live in camp.

Other objects and advantages of the invention will be set forth in the ensuing description.

Figure 1:
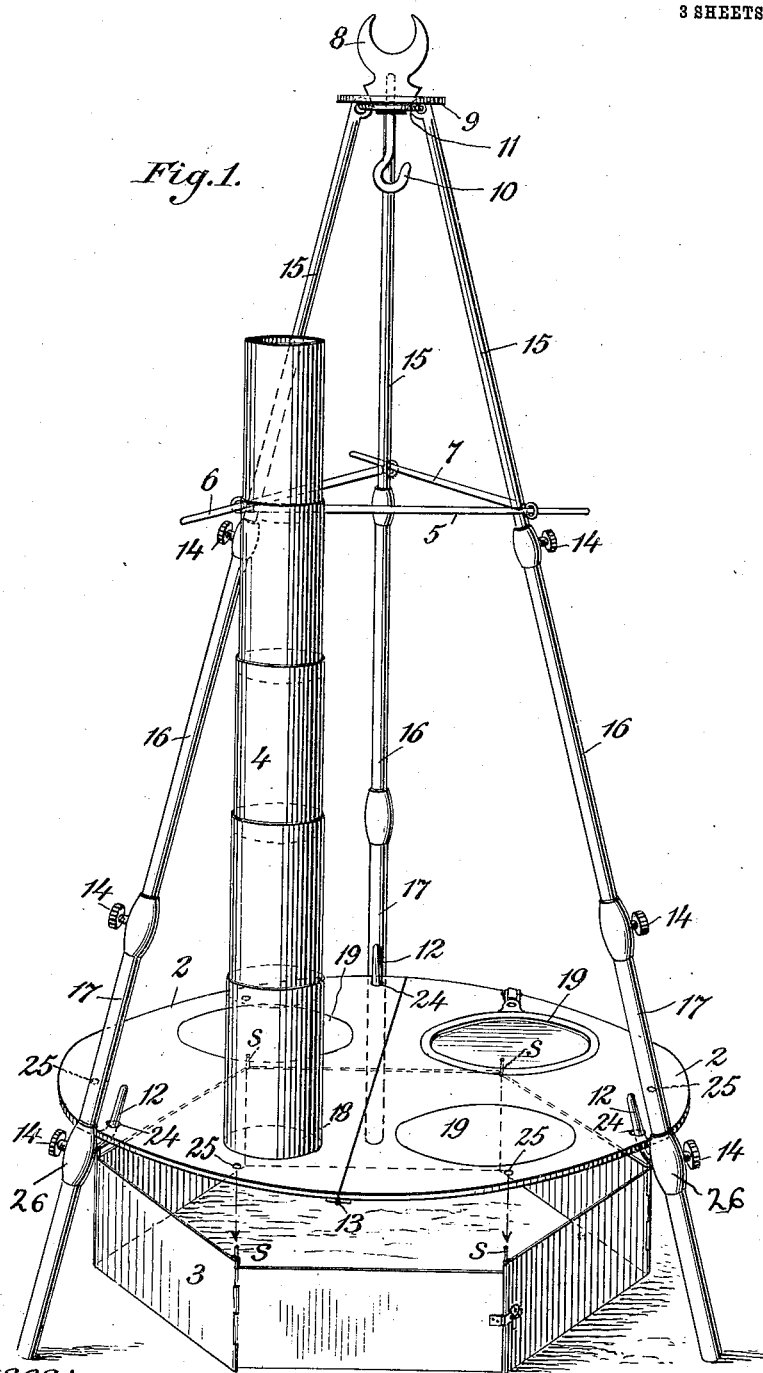
Figure 5:
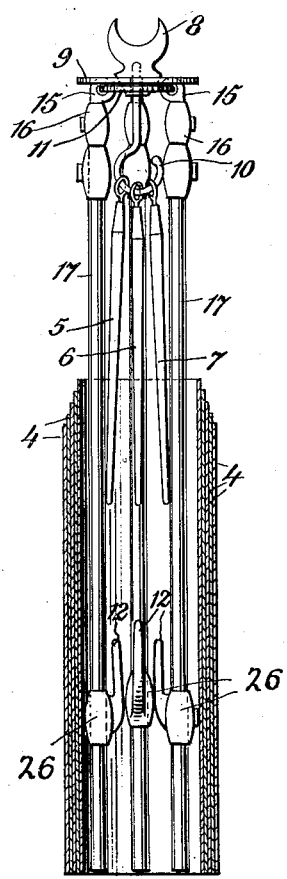
Figure 7:
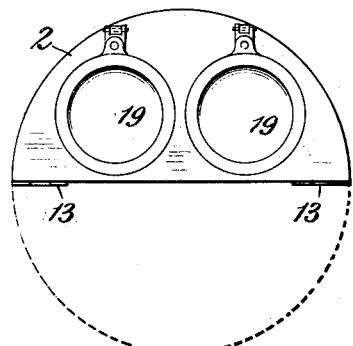
Figure 8:
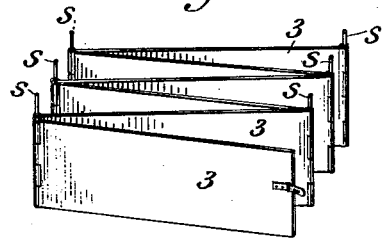
Figure 6:
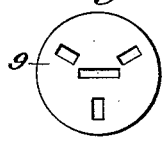

Referring to the drawings: Figure 1 is a perspective view of the apparatus. Fig. 2 is an elevation view, partly in section, of a certain extensible brace used in the apparatus. Fig. 3 is an elevation view of the same brace, taken at right angles to the view shown in Fig. 2. Fig. 4 is a plan view, on smaller scale, of the top of a fire-box forming part of the apparatus. Fig. 5 is an elevation view, partly in section, showing a greater portion of the apparatus telescoped and nested together for packing or carrying. Fig. 6 is a plan view, on larger scale, of a portion of a tripod-head forming part of the apparatus. Fig. 7 is a plan view, on same scale as Fig. 4, showing the top portion of the fire-box folded for packing or carrying. Fig. 8 is a perspective view of the jointed side walls of the fire-box partly folded together for packing or carrying.

Referring to the several figures, in all of which like characters of reference designate like parts, the improved apparatus is composed in part of a supporting tripod, which acts as a support for other parts of the apparatus and is adapted to other uses later described. The legs of the tripod are each composed of sections 15, 16, and 17, which fit together telescopically so that they may be adjusted in height or be completely telescoped together into the position shown in Fig. 5. The upper ends of each of the sections 17 and 16 are reinforced in strength and provided with set screws 14, so that the sections telescoping into them may be locked in any desired position. The upper ends of the sections 15 of the tripod-legs are secured pivotally to a tripod-head 9, which is shown separately in Fig. 6, the pivotal attachment being accomplished by hooking the sections 15 into a circular disk 11 and securing said disk flatly against the lower face of the tripod-head by a bolt 10 which passes up through said disk and head and is screw-threaded into a nut 8. The tripod-head 9 is slotted radially as shown in Fig. 6, to form a clearance for the upper ends of the pivoted sections 15. The nut 8 above the tripod-head 9 projects upward and is bifurcated to form a suitable support on which to rest a gun-barrel or a field-glass in shooting at targets or game or viewing the country, or this support 8 may support one end of the ridge-pole of a tent or a pole for hanging game, drying clothes, and the like. The lower end of the bolt 10 is formed into a hook which will support a lantern, a kettle, or anything which it is desired to hang over or about the stove portion of the apparatus later described.

The legs of the tripod are braced or connected together by horizontal bars 5, 6, and 7, said bars lying outside of and against said legs, and being each provided on one end with a ring through which the pointed end of the adjacent bar passes to form the three bars into a triangular embracing frame. In placing the bars 5, 6, and 7 into place, it is more convenient to have at least one of them arranged so that it can be lengthened, and to this end the brace 7 is formed of two sections which telescope together as shown in Fig. 2, the inside section being square and being provided on one corner with a series of notches 23 which are engaged by an elastic tongue 20 projecting inward from the wall of the outer section 19' to limit or prevent the shortening movements of the brace. To disengage the notches 23 from the tongue 20, the inner section of the brace 7 is revolved in the outer member 19', thus bringing another corner of said inner section into contact with said tongue 20 and allowing the parts of the brace to be set to any desired length. The inner section of the brace 7 is prevented from slipping entirely out of the outer section 19' by a tongue 21 which projects inward from the wall of said outer section and is adapted to catch a head or stop 22 on the end of said inner member, as shown in Fig. 2. In addition to bracing the legs of the tripod, the braces 5, 6, and 7 and their outwardly-projecting ends form supports upon which to hang fabric articles for drying.

The lower portion of the apparatus is formed into an inclosure to perform the function of a stove, the inclosure consisting of a side wall comprising a number of flat sheet-metal sections 3 which are pivoted together by pivot-pins S so that they may be folded together as shown in Fig. 8 for packing or carrying. The inclosure is provided with a circular sheet-metal top portion 2, which is pivoted together on a diametric line so that it may be folded into the position shown in Fig. 7 for packing and carrying. The hinges 13 which pivot the top portion 2 are placed on the under side thereof so that the folding-line rises upward in folding said top together, and since the parts cannot open past a perfect plane the top can be supported at the edges without dropping down at the center. In assembling the inclosure, the top portion 2 lies on top of the sections 3 of the side wall, the pivot-pins S of said sections 3 extending up through holes 25 in said top portion to hold the same against displacement. To connect the inclosure with the legs of the tripod, the lower sections 17 of said legs are provided with slidable sleeves 26 which are provided with set screws 14 so that they may be clamped after being adjusted to proper height. These sleeves 26 are each provided with a finger or horn 12 which projects upward through a hole 24 in the top portion 2, thus securing said top and the tripod legs together.

The inclosure formed by the wall sections 3 and the top 2 is adapted to contain wood, straw, or any fuel that can be obtained while camping, to be burned for cooking or warming purposes, the ground forming the bottom of the inclosure.

To cool the top portion 2 slightly while cooking, or to give the inclosure draft above the fire, the sleeves 26 on the lower sections of the tripod legs may be slid upward to support the top portion of the inclosure clear of the side walls 3, as shown in Fig. 1.

The top portion 2 of the inclosure is provided with the common openings over which griddles or frying-pans 19 are placed for cooking, and also with an opening 18 over which a sheet-metal flue 4 is mounted, said flue being composed of a number of sections which telescope together.

In reducing the size of the apparatus for packing or carrying, the sections of the tripod-legs are slid together, as are also the sections of the flue 4, and the tripod is slipped inside of the flue as shown in Fig. 5.

The foregoing being a full, clear, and exact description of the invention, what I claim and desire to secure by Letters Patent is:

1. In apparatus of the character described, a casing adapted to form a fire-box, a flue on the casing, a tripod adapted to stand over the casing for supporting the top of the casing, the tripod being adapted to be folded and placed within the flue of the casing for packing or carrying.

2. In apparatus of the character described, a casing adapted to form a fire-box, the casing comprising side walls pivoted together and a top portion detachable from said walls, a tripod adapted to stand over said casing, supports on the tripod legs for securing said legs to the top portion of the fire-box, said supports being slidable upon the tripod legs and having set screws for clamping them against movement.

3. In apparatus of the character described, a casing comprising side walls pivoted together and a top portion adapted to rest removably upon said walls, the top portion being composed of a plurality of sections pivoted together, a tripod adapted to stand over the casing, the tripod legs having slidable supports and means for locking said supports against movement, horns on said supports for engaging the top of the casing, the legs of the tripod being connected by an embracing frame-work, said frame-work being composed of detachable bars.

4. In apparatus of the character described, a casing adapted to form a fire-box, a flue for the casing, a tripod adapted to stand above the casing for supporting the top of the casing, the flue being composed of a plurality of sections telescoping each other, and being adapted to contain the tripod for packing or carrying the apparatus.

GEORGE E. CRONK.

Witnesses:
MATTHEW T. CRONK,
BENJAMIN CRONKITE.